United States Patent
Talathi et al.

(10) Patent No.: US 10,339,447 B2
(45) Date of Patent: Jul. 2, 2019

(54) CONFIGURING SPARSE NEURONAL NETWORKS

(71) Applicant: QUALCOMM Incorporated, San Diego, CA (US)

(72) Inventors: Sachin Subhash Talathi, San Diego, CA (US); David Jonathan Julian, San Diego, CA (US); Venkata Sreekanta Reddy Annapureddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 640 days.

(21) Appl. No.: 14/449,101

(22) Filed: Jul. 31, 2014

(65) Prior Publication Data

US 2015/0206048 A1 Jul. 23, 2015

Related U.S. Application Data

(60) Provisional application No. 61/939,537, filed on Feb. 13, 2014, provisional application No. 61/930,849, filed on Jan. 23, 2014, provisional application No. 61/930,858, filed on Jan. 23, 2014.

(51) Int. Cl.
*G06N 3/08* (2006.01)
*G06N 3/04* (2006.01)

(52) U.S. Cl.
CPC ............. *G06N 3/08* (2013.01); *G06N 3/049* (2013.01); *G06N 3/0481* (2013.01); *G06N 3/082* (2013.01)

(58) Field of Classification Search
CPC ........................................................ G06N 3/082
USPC .......................................................... 706/25
See application file for complete search history.

(56) References Cited

U.S. PATENT DOCUMENTS

| | | |
|---|---|---|
| 7,392,079 B2 | 6/2008 | Donoghue et al. |
| 8,095,210 B2 | 1/2012 | Burdick et al. |
| 8,521,670 B2 | 8/2013 | Paguio |
| 8,577,820 B2 | 11/2013 | Jin et al. |
| 8,606,732 B2 | 12/2013 | Venkatraman et al. |
| 8,615,476 B2 | 12/2013 | Berger et al. |
| 8,630,966 B2 | 1/2014 | Gage et al. |
| 2011/0022369 A1 | 1/2011 | Carroll et al. |

(Continued)

FOREIGN PATENT DOCUMENTS

| | | |
|---|---|---|
| CN | 101470813 A | 7/2009 |
| CN | 101501711 A | 8/2009 |

(Continued)

OTHER PUBLICATIONS

Sprechmann et al ("Learning Efficient Structured Sparse Models" 2012).*

(Continued)

*Primary Examiner* — Lut Wong
(74) *Attorney, Agent, or Firm* — Seyfarth Shaw LLP

(57) ABSTRACT

A method for selecting a reduced number of model neurons in a neural network includes generating a first sparse set of non-zero decoding vectors. Each of the decoding vector is associated with a synapse between a first neuron layer and a second neuron layer. The method further includes implementing the neural network only with selected model neurons in the first neuron layer associated with the non-zero decoding vectors.

24 Claims, 16 Drawing Sheets

(56) References Cited

U.S. PATENT DOCUMENTS

| | | | |
|---|---|---|---|
| 2012/0023051 A1* | 1/2012 | Pishehvar | G06N 3/049 706/21 |
| 2013/0041859 A1 | 2/2013 | Esterlilne | |
| 2013/0304447 A1 | 11/2013 | Szatmary et al. | |
| 2013/0325767 A1 | 12/2013 | Hunzinger | |
| 2014/0081895 A1 | 3/2014 | Coenen et al. | |
| 2015/0067009 A1* | 3/2015 | Strauss | G06F 17/16 708/203 |

FOREIGN PATENT DOCUMENTS

| | | |
|---|---|---|
| CN | 101971166 A | 2/2011 |
| CN | 102341815 A | 2/2012 |
| CN | 103164741 A | 6/2013 |
| TW | 201351309 A | 12/2013 |
| WO | 2012018946 A1 | 2/2012 |
| WO | 2013119861 A1 | 8/2013 |
| WO | 2013170036 A2 | 11/2013 |
| WO | 2013181109 | 12/2013 |

OTHER PUBLICATIONS

Zhang et al ("Sparse ensembles using weighted combination methods based on linear programming" 2011).*

Bekolay, T., et al., "Simultaneous Unsupervised and Supervised Learning of Cognitive Functions in Biologically Plausible Spiking Neural Networks," Proceedings of the 35th Annual Conference of the Cognitive Science Society, 2013, pp. 169-174.

Eliasmith C., et al., "Neural Engineering: Computation, Representation and Dynamics in Neurobiological Systems," 2002, MIT Press Cambridge, MA, 47 pages.

Tibshirani R., "Regression Shrinkage and Selection via the Lasso," in Journal of the Royal Statistical Society. Series B (Methodological), 1996, vol. 58, No. 1, pp. 267-288.

Carlson K.D., et al., "An Efficient Automated Parameter Tuning Framework for Spiking Neural Networks," Frontiers in Neuroscience, Jan. 17, 2014, vol. 8, XP055192436.

Farries M.A., et al., "Reinforcement Learning with Modulated Spike Timing-Dependent Synaptic Plasticity," Journal of Neurophysiology, 2007, vol. 98, pp. 3648-3665, XP055192453.

Hunsberger E., et al., "A Neural Model of Human Image Categorization", [PREPRINT] submitted to 35th annual meeting of the Cognitive Science Society (CogSci'13) to be held on Jul. 31-Aug. 3, 2013, Jul. 25, 2013 (Jul. 25, 2013), XP055193589, Retrieved from the Internet: URL:http://compneuro.uwaterloo.ca/files/publications/hunsberger.2013a.pdf [retrieved on Jun. 3, 2015].

International Search Report and Written Opinion—PCT/US2014/068449—ISAEPO—dated Jun. 15, 2015.

Pham V., et al., "Dropout Improves Recurrent Neural Networks for Handwriting Recognition", arXiv:1312.4569v1, Nov. 5, 2013 (Nov. 5, 2013). XP055193460, Retrieved from the Internet: URL:http://arxiv.org/abs/1312.4569v1 [retrieved on Jun. 3, 2015].

Stewart T.C., et al., "Python Scripting in the Nengo Simulator," Frontiers in Neuroinformatics, Mar. 24, 2009, vol. 3, XP055192431.

Tapson J.C., et al., "Synthesis of Neural Networks for Spatio-Temporal Spike Pattern Recognition and Processing," Frontiers in Neuroscience, Aug. 2013, vol. 7, XP055192522.

Tran K., et al., "Demystifying Sparse Rectified Auto-Encoders", Proceedings of the 4th Symposium on Information and Communication Technology (SOICT'13), Dec. 5, 2013 (Dec. 5, 2013), pp. 101-107, XP058036439, DOI: 10.1145/2542050.2542065.

Druckmann S., et al., "Evaluating Automated Parameter Constraining Procedures of Neuron Models by Experimental and Surrogate Data," Biological Cybernetics 2008, DOI: 10.1007/s00422-008-0269-2, May 17, 2008, Accepted: Sep. 23, 2008, 9 Pages.

Taiwan Search Report—TW103142629—TIPO—dated Jan. 16, 2018.

* cited by examiner

CONFIGURING SPARSE NEURONAL NETWORKS

CROSS-REFERENCE TO RELATED APPLICATION

The present application claims the benefit of U.S. Provisional Patent Application No. 61/930,858, filed on Jan. 23, 2014, U.S. Provisional Patent Application No. 61/930,849, filed on Jan. 23, 2014, and U.S. Provisional Patent Application No. 61/939,537, filed on Feb. 13, 2014, the disclosures of which are expressly incorporated by reference herein in its entirety.

BACKGROUND

Field

Certain aspects of the present disclosure generally relate to neural system engineering and, more particularly, to systems and methods for operating a neural network with a reduced number of model neurons.

Background

An artificial neural network, which may comprise an interconnected group of artificial neurons (i.e., neuron models), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome.

SUMMARY

In one aspect, a method for selecting a reduced number of model neurons in a neural network is disclosed. The method includes generating a first sparse set of non-zero decoding vectors. Each of the decoding vector is associated with a synapse between a first neuron layer and a second neuron layer. The method further includes implementing the neural network only with selected model neurons in the first neuron layer associated with the non-zero decoding vectors.

In another aspect, an apparatus for selecting a reduced number of model neurons in a neural network is disclosed. The apparatus includes a memory and one or more processors coupled to the memory. The processor(s) is(are) configured to generate a first sparse set of non-zero decoding vectors. Each of the decoding vector is associated with a synapse between a first neuron layer and a second neuron layer. The processor(s) is(are) further configured to implement the neural network only with selected model neurons in the first neuron layer associated with the non-zero decoding vectors.

In yet another aspect, an apparatus for selecting a reduced number of model neurons in a neural network is disclosed. The apparatus includes means for generating a first sparse set of non-zero decoding vectors. Each of the decoding vector is associated with a synapse between a first neuron layer and a second neuron layer. The apparatus further includes means for implementing the neural network only with selected model neurons in the first neuron layer associated with the non-zero decoding vectors.

In still another aspect, a computer program product for selecting a reduced number of model neurons in a neural network is disclosed. The computer program product includes a non-transitory computer readable medium having encoded thereon program code. The program coded includes program code to generate a first sparse set of non-zero decoding vectors. Each of the decoding vector is associated with a synapse between a first neuron layer and a second neuron layer. The program code further includes program code to implement the neural network only with selected model neurons in the first neuron layer associated with the non-zero decoding vectors.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System, Training and Operation

Figure 1:
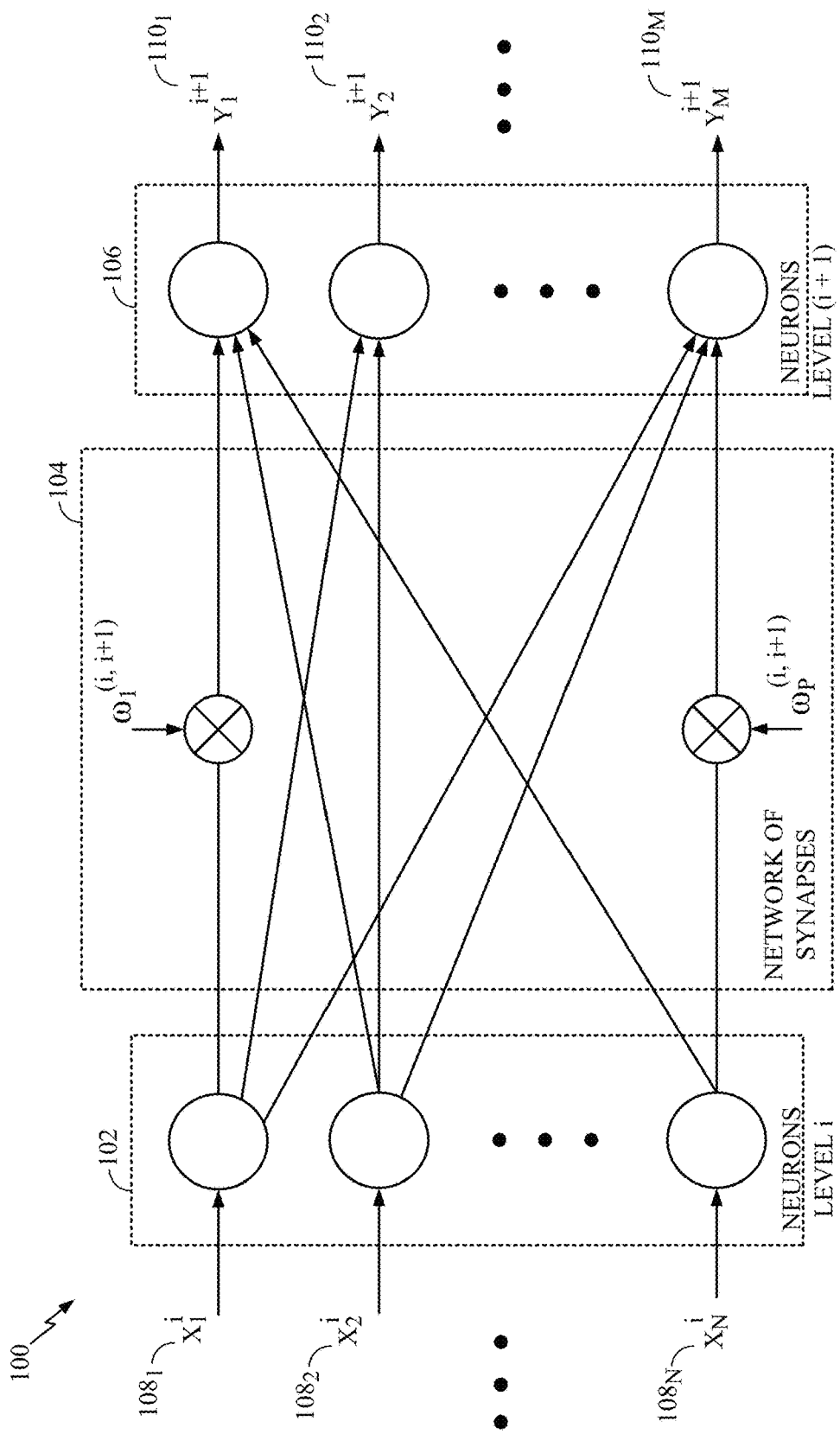
FIG. 1 illustrates an example network of neurons in accordance with certain aspects of the present disclosure.

FIG. 1 illustrates an example artificial neural system 100 with multiple levels of neurons in accordance with certain aspects of the present disclosure. The neural system 100 may have a level of neurons 102 connected to another level of neurons 106 through a network of synaptic connections 104 (i.e., feed-forward connections). For simplicity, only two levels of neurons are illustrated in FIG. 1, although fewer or more levels of neurons may exist in a neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106). In some modeling approaches, the neuron may continuously transfer a signal to the next level of neurons. This signal is typically a function of the membrane potential. Such behavior can be emulated or simulated in hardware and/or software, including analog and digital implementations such as those described below.

In biological neurons, the output spike generated when a neuron fires is referred to as an action potential. This electrical signal is a relatively rapid, transient, nerve impulse, having an amplitude of roughly 100 mV and a duration of about 1 ms. In a particular embodiment of a neural system having a series of connected neurons (e.g., the transfer of spikes from one level of neurons to another in FIG. 1), every action potential has basically the same amplitude and duration, and thus, the information in the signal may be represented only by the frequency and number of spikes, or the time of spikes, rather than by the amplitude. The information carried by an action potential may be determined by the spike, the neuron that spiked, and the time of the spike relative to other spike or spikes. The importance of the spike may be determined by a weight applied to a connection between neurons, as explained below.

The transfer of spikes from one level of neurons to another may be achieved through the network of synaptic connections (or simply "synapses") 104, as illustrated in FIG. 1. Relative to the synapses 104, neurons of level 102 may be considered presynaptic neurons and neurons of level 106 may be considered postsynaptic neurons. The synapses 104 may receive output signals (i.e., spikes) from the level 102 neurons and scale those signals according to adjustable synaptic weights $w_1^{(i,i+1)}, \ldots, w_P^{(i,i+1)}$ where P is a total number of synaptic connections between the neurons of levels 102 and 106 and i is an indicator of the neuron level. In the example of FIG. 1, i represents neuron level 102 and i+1 represents neuron level 106. Further, the scaled signals may be combined as an input signal of each neuron in the level 106. Every neuron in the level 106 may generate output spikes 110 based on the corresponding combined input signal. The output spikes 110 may be transferred to another level of neurons using another network of synaptic connections (not shown in FIG. 1).

Biological synapses can mediate either excitatory or inhibitory (hyperpolarizing) actions in postsynaptic neurons and can also serve to amplify neuronal signals. Excitatory signals depolarize the membrane potential (i.e., increase the membrane potential with respect to the resting potential). If enough excitatory signals are received within a certain time period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching a threshold. In addition to counteracting synaptic excitation, synaptic inhibition can exert powerful control over spontaneously active neurons. A spontaneously active neuron refers to a neuron that spikes without further input, for example due to its dynamics or a feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, where synaptic weight changes may relate to changes of the memristor resistance. With nanometer feature-sized memristors, the area of a neuron circuit and synapses may be substantially reduced, which may make implementation of a large-scale neural system hardware implementation more practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, where a particular functionality may be based on synaptic weights stored in a memory card currently attached to the neural processor.

Figure 2:
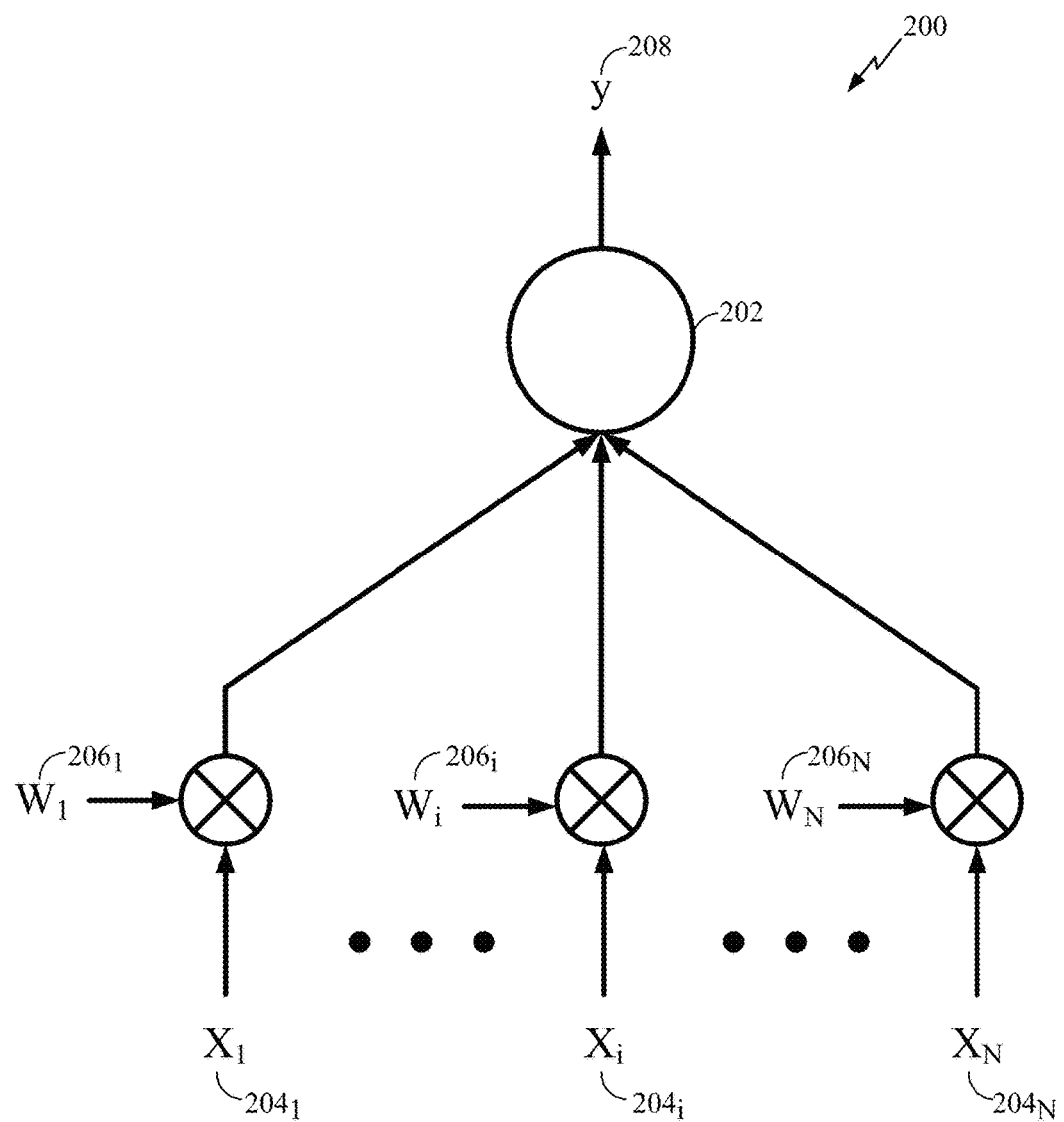
FIG. 2 illustrates an example of a processing unit (neuron) of a computational network (neural system or neural network) in accordance with certain aspects of the present disclosure.

FIG. 2 illustrates an exemplary diagram 200 of a processing unit (e.g., a neuron or neuron circuit) 202 of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$, which may be signals external to the neural system, or signals generated by other neurons of the same neural system, or both. The input signal may be a current, a conductance, a voltage, a real-valued, and/or a complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($W_1$-$W_N$), where N may be a total number of input connections of the neuron 202.

The neuron 202 may combine the scaled input signals and use the combined scaled inputs to generate an output signal 208 (i.e., a signal Y). The output signal 208 may be a current, a conductance, a voltage, a real-valued and/or a complex-valued. The output signal may be a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by electrical connections with synaptic circuits. The processing unit 202 and its input and output connections may also be emulated by a software code. The processing unit 202 may also be emulated by an electric circuit, whereas its input and output connections may be emulated by a software code. In an aspect, the processing unit 202 in the computational network may be an analog electrical circuit. In another aspect, the processing unit 202 may be a digital electrical circuit. In yet another aspect, the processing unit 202 may be a mixed-signal electrical circuit with both analog and digital components. The computational network may include processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Those skilled in the art will appreciate that examples of the learning rule include, but are not limited to the spike-timing-dependent plasticity (STDP) learning rule, the Hebb rule, the Oja rule, the Bienenstock-Copper-Munro (BCM) rule, etc. In certain aspects, the weights may settle or converge to one of two values (i.e., a bimodal distribution of weights). This effect can be utilized to reduce the number of bits for each synaptic weight, increase the speed of reading and writing from/to a memory storing the synaptic weights, and to reduce power and/or processor consumption of the synaptic memory.

Synapse Type

In hardware and software models of neural networks, the processing of synapse related functions can be based on synaptic type. Synapse types may be non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of multiple types is that processing can be subdivided. For example, non-plastic synapses may not use plasticity functions to be executed (or waiting for such functions to complete). Similarly, delay and weight plasticity may be subdivided into operations that may operate together or separately, in sequence or in parallel. Different types of synapses may have different lookup tables or formulas and parameters for each of the different plasticity types that apply. Thus, the methods would access the relevant tables, formulas, or parameters for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) s structural plasticity (i.e., an amount of delay change) may be a direct function of pre-post spike time difference. Alternatively, structural plasticity may be set as a function of the weight change amount or based on conditions relating to bounds of the weights or weight changes. For example, a synapse delay may change only when a weight change occurs or if weights reach zero but not if they are at a maximum value. However, it may be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as for computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity and homeostatic plasticity.

STDP is a learning process that adjusts the strength of synaptic connections between neurons. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. On the other hand, long-term depression (LTD) may occur if an input spike tends, on average, to occur immediately after an output spike. Then, that particular input is made somewhat weaker, and hence the name "spike-timing-dependent plasticity." Consequently, inputs that might be the cause of the postsynaptic neuron's excitation are made even more likely to contribute in the future, whereas inputs that are not the cause of the postsynaptic spike are made less likely to contribute in the future. The process continues until a subset of the initial set of connections remains, while the influence of all others is reduced to an insignificant level.

Because a neuron generally produces an output spike when many of its inputs occur within a brief period (i.e., being cumulative sufficient to cause the output), the subset of inputs that typically remains includes those that tended to be correlated in time. In addition, because the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a presynaptic neuron to a postsynaptic neuron as a function of time difference between spike time $t_{pre}$ of the presynaptic neuron and spike time $t_{post}$ of the postsynaptic neuron (i.e., $t=t_{post}-t_{pre}$). A typical formulation of the STDP is to increase the synaptic weight (i.e., potentiate the synapse) if the time difference is positive (the presynaptic neuron fires before the postsynaptic neuron), and decrease the synaptic weight (i.e., depress the synapse) if the time difference is negative (the postsynaptic neuron fires before the presynaptic neuron).

In the STDP process, a change of the synaptic weight over time may be typically achieved using an exponential decay, as given by:

$$\Delta w(t) = \begin{cases} a_+ e^{-t/k_+} + \mu, t > 0 \\ a_- e^{t/k_-}, t < 0 \end{cases}, \quad (1)$$

where $k_+$ and $k_-$ $\tau sign(\Delta t)\tau_{sign(\Delta t)}$ are time constants for positive and negative time difference, respectively, $a_+$ and $a_-$ are corresponding scaling magnitudes, and $\mu$ is an offset that may be applied to the positive time difference and/or the negative time difference.

Figure 3:
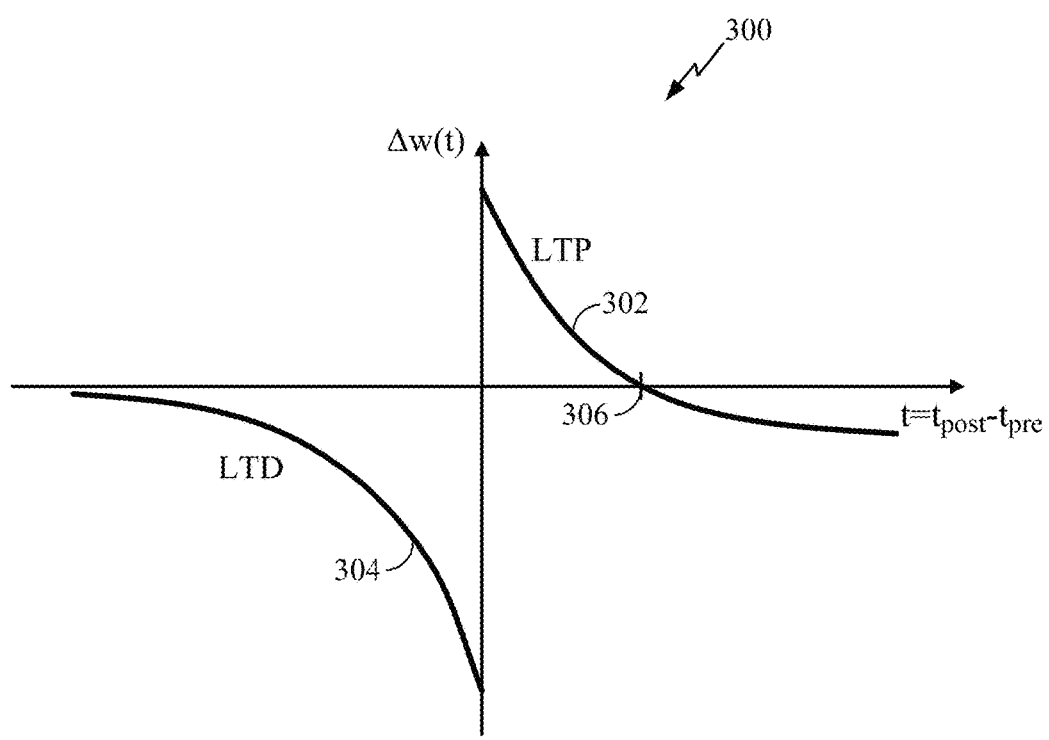
FIG. 3 illustrates an example of spike-timing dependent plasticity (STDP) curve in accordance with certain aspects of the present disclosure.

FIG. 3 illustrates an exemplary diagram 300 of a synaptic weight change as a function of relative timing of presynaptic and postsynaptic spikes in accordance with the STDP. If a presynaptic neuron fires before a postsynaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between presynaptic and postsynaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1. In the case of a frame-based input (i.e., an input that is in the form of a frame of a particular duration comprising spikes or pulses), the offset value $\mu$ can be computed to reflect the frame boundary. A first input spike (pulse) in the frame may be considered to decay over time either as modeled by a postsynaptic potential directly or in terms of the effect on neural state. If a second input spike (pulse) in the frame is considered correlated or relevant to a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any), can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics:

$$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ wm,n is a synaptic weight for the synapse connecting a presynaptic neuron m to a postsynaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a postsynaptic neuron is established until the time when the postsynaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e.:

$$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in a biologically-consistent linear fashion. The time constant in the supra-threshold regime, positive by convention, reflects anti-leaky channel dynamics generally driving a cell to spike while incurring latency in spike-generation.

Figure 4:
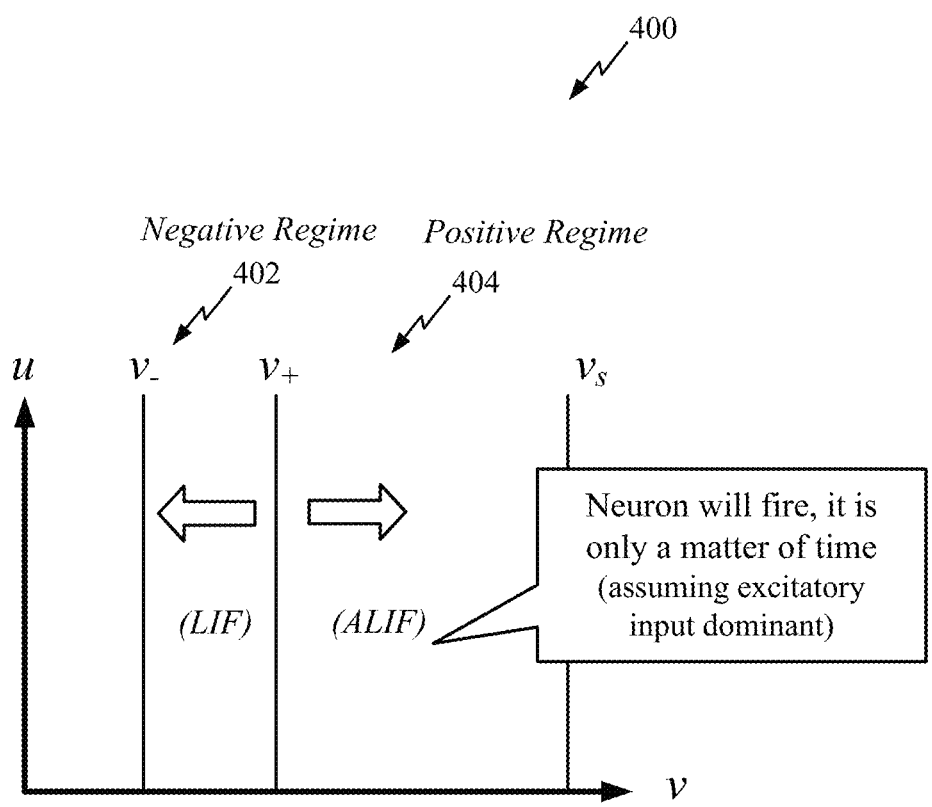
FIG. 4 illustrates an example of a positive regime and a negative regime for defining behavior of a neuron model in accordance with certain aspects of the present disclosure.

As illustrated in FIG. 4, the dynamics of the model 400 may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest ($v_-$) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as:

$$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol $\rho$ is used herein to denote the dynamics regime with the convention to replace the symbol $\rho$ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are:

$$q_\rho = -\tau_\rho \beta u - v_\rho \quad (7)$$

$$r = \delta(v + \varepsilon) \quad (8)$$

where $\delta$, $\varepsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward v in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter $\delta$ is a scale factor controlling the slope of the u null-cline. The parameter $\varepsilon$ is typically set equal to $-v_-$. The parameter $\beta$ is a resistance value controlling the slope of the v null-clines in both regimes. The $\tau_\rho$ time-constant parameters control not only the exponential decays, but also the null-cline slopes in each regime separately.

The model may be defined to spike when the voltage v reaches a value $v_s$. Subsequently, the state may be reset at a reset event (which may be one and the same as the spike event):

$$v = \hat{v}_- \quad (9)$$

$$u = u + \Delta u \quad (10)$$

where $\hat{v}_-$ and $\Delta u$ are parameters. The reset voltage $\hat{v}_-$ is typically set to $v_-$.

By a principle of momentary coupling, a closed form solution is possible not only for state (and with a single exponential term), but also for the time to reach a particular state. The close form state solutions are:

$$v(t + \Delta t) = (v(t) + q_\rho)e^{\frac{\Delta t}{\tau_\rho}} - q_\rho \quad (11)$$

$$u(t + \Delta t) = (u(t) + r)e^{-\frac{\Delta t}{\tau_u}} - r \quad (12)$$

Therefore, the model state may be updated only upon events, such as an input (presynaptic spike) or output (postsynaptic spike). Operations may also be performed at any particular time (whether or not there is input or output).

Moreover, by the momentary coupling principle, the time of a postsynaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by:

$$\Delta t = \tau_\rho \log \frac{v_f + q_\rho}{v_0 + q_\rho} \quad (13)$$

If a spike is defined as occurring at the time the voltage state v reaches $v_s$, then the closed-form solution for the amount of time, or relative delay, until a spike occurs as measured from the time that the voltage is at a given state v is:

$$\Delta t_S = \begin{cases} \tau_+ \log \frac{v_s + q_+}{v + q_+} & \text{if } v > \hat{v}_+ \\ \infty & \text{otherwise} \end{cases} \quad (14)$$

where $\hat{v}_+$ is typically set to parameter $v_-$, although other variations may be possible.

The above definitions of the model dynamics depend on whether the model is in the positive or negative regime. As mentioned, the coupling and the regime ρ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily use iterative methods or Numerical methods. An event-based implementation is also possible at a limited time resolution in a step-based simulator by only updating the model if an event occurs at or between steps or by "step-event" update.

Optimizations for Operating a Neural Network

Neural networks may include multiple layers of neurons that may fire at various times according to a neuron model and neuron state. As the population of neurons in the network increases, the number of neurons spiking in the network increases and in turn, the power consumed in operating the neural network likewise increases.

Aspects of the present disclosure are directed to improving or even optimizing a neural network. In some exemplary configuration, the improvements may include operating a neural network at a reduced firing rate and/or operating with a reduced set of model neurons. Such improvements may reduce power consumption and improve scalability of the neural network among other benefits.

Figure 5:
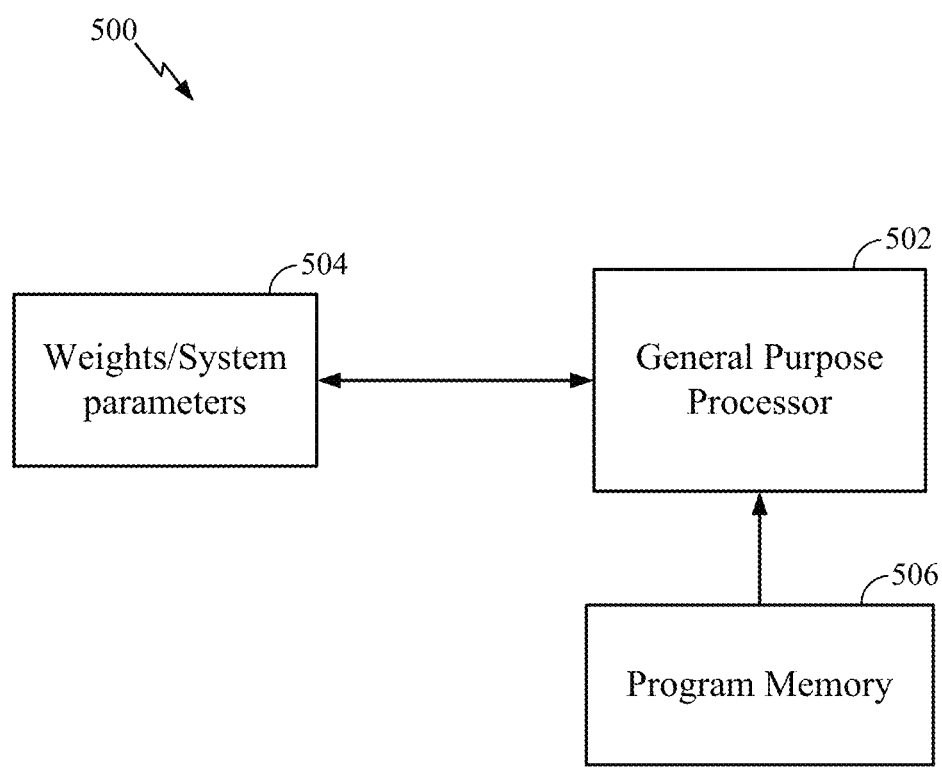
FIG. 5 illustrates an example implementation of designing a neural network using a general-purpose processor in accordance with certain aspects of the present disclosure.

FIG. 5 illustrates an example implementation 500 of operating a neural network using a general-purpose processor 502 in accordance with certain aspects of the present disclosure. Variables (neural signals), synaptic weights, system parameters associated with a computational network (neural network), delays, and frequency bin information may be stored in a memory block 504, while instructions executed at the general-purpose processor 502 may be loaded from a program memory 506. In an aspect of the present disclosure, the instructions loaded into the general-purpose processor 502 may comprise code for selecting a neuron model based on a selected rate bandwidth.

In another exemplary configuration, the general-purpose processor 502 may comprise code for generating a first sparse set of non-zero decoding vectors, each decoding vector being associated with a synapse between a first neuron layer and a second neuron layer. Further, in this exemplary configuration, the general-purpose processor 502 may comprise code for implementing the neural network only with selected model neurons in the first neuron layer associated with the non-zero decoding vectors.

In yet another exemplary configuration, the general-purpose processor 502 may comprise code for selecting a neuron model with a membrane potential that changes linearly based on an input current. Further, in this exemplary configuration, the general-purpose processor 502 may comprise code for resetting the membrane potential to a predetermined value when the membrane potential reaches a threshold.

Figure 6:
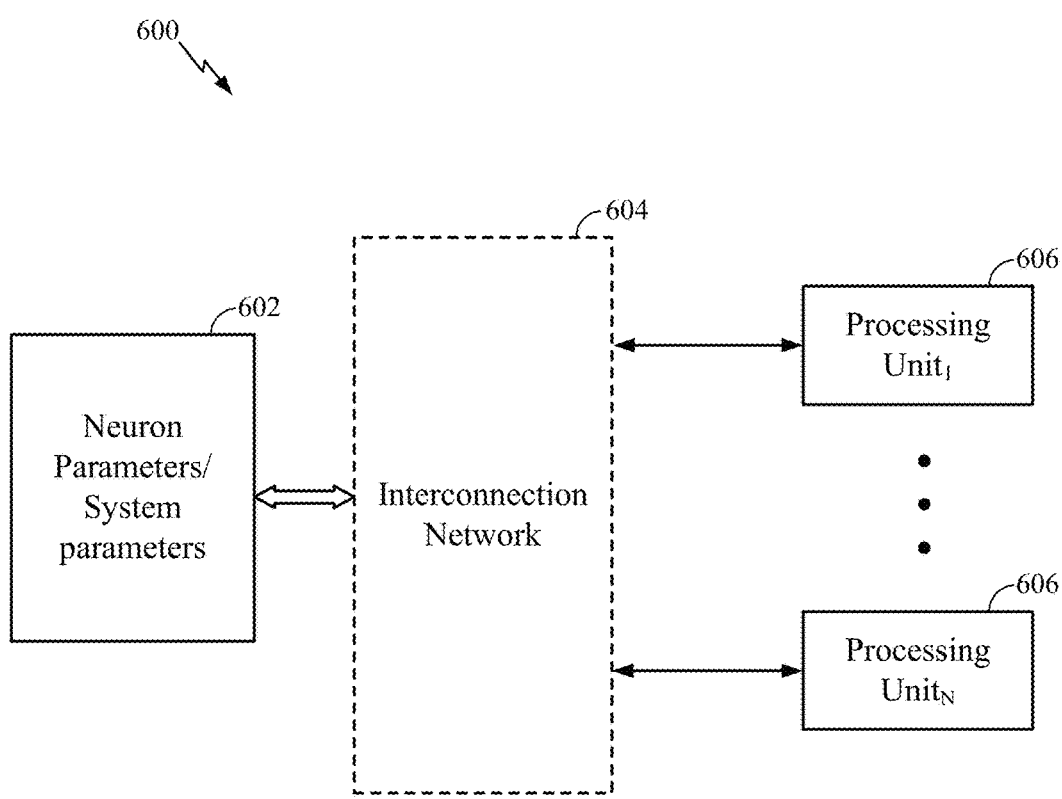
FIG. 6 illustrates an example implementation of designing a neural network where a memory may be interfaced with individual distributed processing units in accordance with certain aspects of the present disclosure.

FIG. 6 illustrates an example implementation 600 of operating a neural network where a memory 602 can be interfaced via an interconnection network 604 with individual (distributed) processing units (neural processors) 606 of a computational network (neural network) in accordance with certain aspects of the present disclosure. Variables (neural signals), synaptic weights, system parameters associated with the computational network (neural network) delays, and/or frequency bin information may be stored in the memory 602, and may be loaded from the memory 602 via connection(s) of the interconnection network 604 into each processing unit (neural processor) 606. In an aspect of the present disclosure, the processing unit 606 may be configured to select a neuron model based on a selected rate bandwidth.

In another exemplary configuration, the processing unit 606 may be configured to generate a first sparse set of non-zero decoding vectors, each decoding vector being associated with a synapse between a first neuron layer and a second neuron layer. Further, in this exemplary configuration, the processing unit 606 may be configured to implement the neural network only with selected model neurons in the first neuron layer associated with the non-zero decoding vectors.

In yet another exemplary configuration, the processing unit 606 may be configured to select a neuron model with a membrane potential that changes linearly based on an input current. Further, in this exemplary configuration, the processing unit 606 may be configured to resetting the membrane potential to a predetermined value when the membrane potential reaches a threshold.

Figure 7:
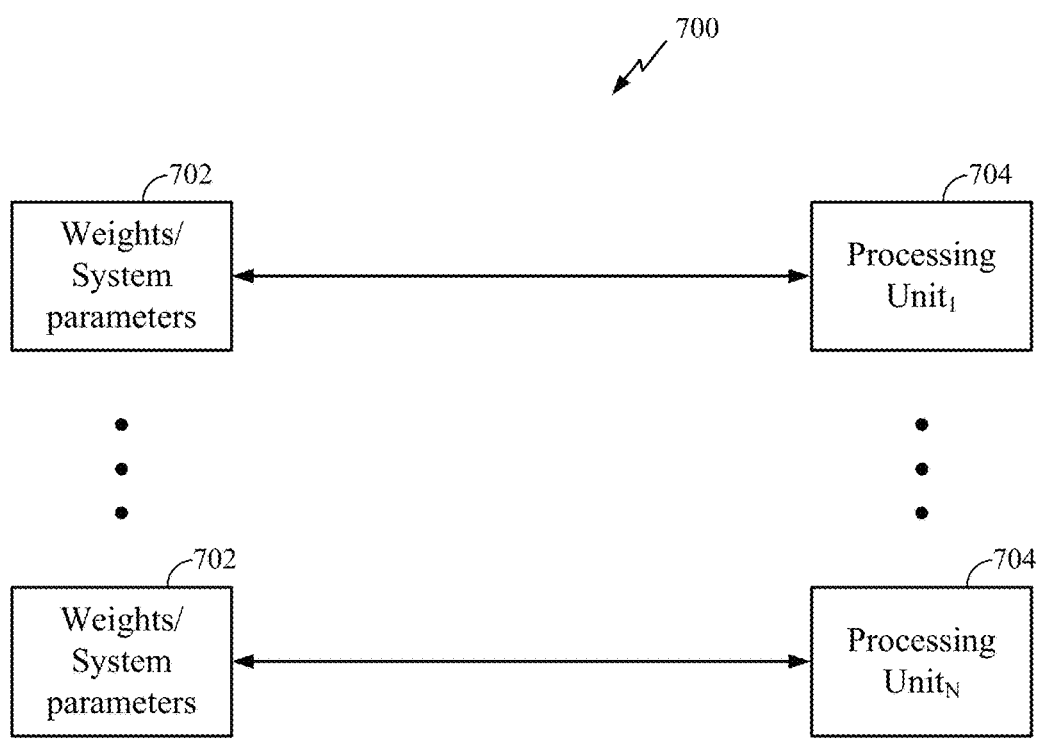
FIG. 7 illustrates an example implementation of designing a neural network based on distributed memories and distributed processing units in accordance with certain aspects of the present disclosure.

FIG. 7 illustrates an example implementation 700 of operating a neural network. As illustrated in FIG. 7, one memory bank 702 may be directly interfaced with one processing unit 704 of a computational network (neural network). Each memory bank 702 may store variables (neural signals), synaptic weights, and/or system parameters associated with a corresponding processing unit (neural processor) 704 delays, and/or frequency bin information. In an aspect of the present disclosure, the processing unit 704 may be configured to select a neuron model based on a selected rate bandwidth.

In another exemplary configuration, the processing unit 704 may be configured to generate a first sparse set of non-zero decoding vectors, each decoding vector being associated with a synapse between a first neuron layer and a second neuron layer. Further, in this exemplary configuration, the processing unit 704 may be configured to implement the neural network only with selected model neurons in the first neuron layer associated with the non-zero decoding vectors.

In yet another exemplary configuration, the processing unit 704 may be configured to select a neuron model with a membrane potential that changes linearly based on an input current. Further, in this exemplary configuration, the processing unit 704 may be configured to reset the membrane potential to a predetermined value when the membrane potential reaches a threshold.

Figure 8:
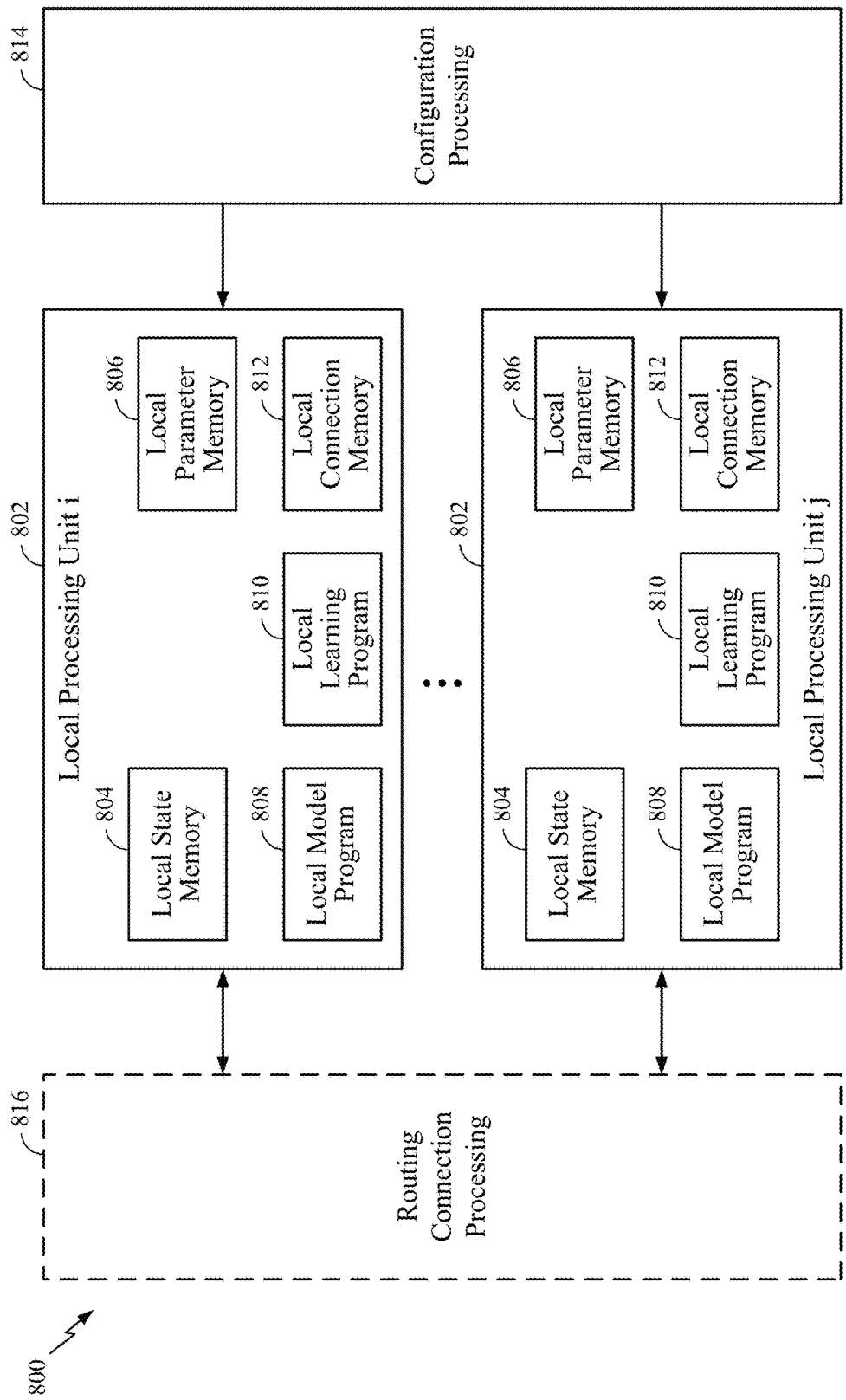
FIG. 8 illustrates an example implementation of a neural network in accordance with certain aspects of the present disclosure.

FIG. 8 illustrates an example implementation of a neural network 800 in accordance with certain aspects of the present disclosure. As illustrated in FIG. 8, the neural network 800 may have multiple local processing units 802 that may perform various operations of methods described herein. Each local processing unit 802 may comprise a local state memory 804 and a local parameter memory 806 that store parameters of the neural network. In addition, the local processing unit 802 may have a local (neuron) model program (LMP) memory 808 for storing a local model program, a local learning program (LLP) memory 810 for storing a local learning program, and a local connection memory 812. Furthermore, as illustrated in FIG. 8, each local processing unit 802 may be interfaced with a configuration processor unit 814 for providing configurations for local memories of the local processing unit, and with a routing unit 816 that provide routing between the local processing units 802.

In one configuration, a neuron model is configured for selecting a rate bandwidth based on a difference between a selected minimum firing rate at which the neural network will operate and a selected maximum firing rate at which the neural network will operate and/or selecting a neuron model based on the selected rate bandwidth. The neuron model includes means for selecting a rate bandwidth and means for selecting a neuron model. In one aspect, the means for selecting a bandwidth and/or means for selecting a neuron model may be the general-purpose processor 502, program memory 506, memory block 504, memory 602, interconnection network 604, processing units 606, processing unit 704, local processing units 802, and or the routing connection processing elements 816 configured to perform the functions recited. In another configuration, the aforementioned means may be any module or any apparatus configured to perform the functions recited by the aforementioned means.

In yet another configuration, a neuron model is configured for reducing a number of model neurons in a neural network. The neuron model includes means for generating a first sparse set of non-zero decoding vectors and means for implementing the neural network. In one aspect, the generating means and/or implementing means may be the general-purpose processor 502, program memory 506, memory block 504, memory 602, interconnection network 604, processing units 606, processing unit 704, local processing units 802, and or the routing connection processing elements 816 configured to perform the functions recited. In another configuration, the aforementioned means may be any module or any apparatus configured to perform the functions recited by the aforementioned means.

In still another configuration, a neuron model is configured to generate a neural network. The neuron model includes means for selecting a neuron model with a membrane potential that changes linearly based on an input current and means for resetting the membrane potential to a predetermined value when the membrane potential reaches a threshold. In one aspect, the selecting means and/or resetting means may be the general-purpose processor 502, program memory 506, memory block 504, memory 602, interconnection network 604, processing units 606, processing unit 704, local processing units 802, and or the routing connection processing elements 816 configured to perform the functions recited. In another configuration, the aforementioned means may be any module or any apparatus configured to perform the functions recited by the aforementioned means.

According to certain aspects of the present disclosure, each local processing unit 802 may be configured to determine parameters of the neural network based upon desired one or more functional features of the neural network, and develop the one or more functional features towards the desired functional features as the determined parameters are further adapted, tuned and updated.

Operating a Neural Network at a Reduced Firing Rate

Aspects of the present disclosure are directed to operating a neural network at a reduced firing rate. Reducing the firing rate or achieving a low firing or spiking rate in the neural network has numerous benefits including reduced power consumption. This is especially so for hardware systems that are configured or even optimized for event-based simulations. In addition, the reduced firing rate may reduce computational complexity and improve scalability in terms of the size of the networks that may be run on the hardware system.

Figure 9:
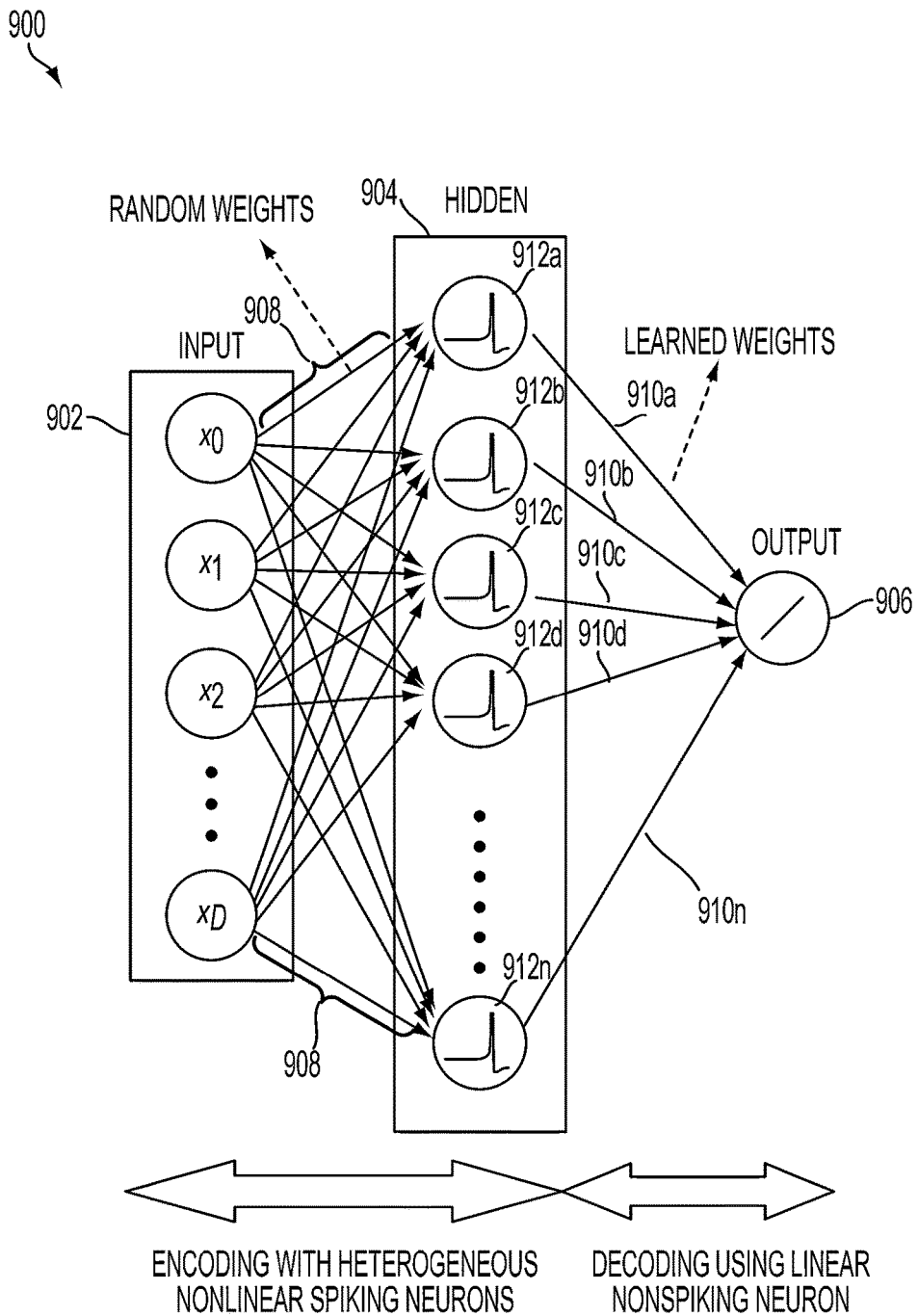
FIG. 9 is a block diagram illustrating an exemplary structure for a neural network in accordance with aspects of the present disclosure.

FIG. 9 is a block diagram illustrating an exemplary structure for a neural network 900 in accordance with aspects of the present disclosure. Referring to FIG. 9, the neural network 900 may have three layers, an input layer 902, a hidden layer 904, and an output layer 906. Although only three layers are shown in the neural network 900, this is merely exemplary and for ease of illustration and explanation. Of course, the neural network may be structured with additional or fewer layers.

Each of the layers of neural network may include one or more neurons, which may be coupled together via synapses (908, 910) in an all-to-all configuration, an all-to-one configuration or any other configuration.

The neurons of the input layer 902 (e.g., x0, . . . , xD) may comprise nonlinear spiking neurons, which may be configured, for example, to receive an analog input and output a spike, which may be supplied to neurons of the hidden layer 904 via synapses 908. In some aspects, the synapses 908 may be configured with randomly initialized weights. The randomly initialized weights may, for example, be provided from a continuous random distribution. In other aspects, the weights for synapses 908 may be differentially assigned such that the weights for each synapse are distinct.

The hidden layer 904 may comprise one or more neurons 912a, 912b, . . . , 912n (which maybe collectively referred to as neurons 912). The neurons 912 may, in some aspects, comprise spiking neurons of a non-linear neuron model. For example, the neurons of the hidden layer 904 may comprise Leaky Integrate and Fire (LIF) neurons, quadratic integrate and Fire (QIF) neurons, Linear Threshold (LT) neurons, Cold neurons, a map based neuron model, a differential equation based neuron model or the like and/or a combination thereof.

The input data (e.g., input current I) may be encoded in the firing rates (or neural response function) of the hidden layer neurons 904. The output layer 906, which may comprise linear non-spiking neurons, may be configured to decode the firing rates and output a linearly weighted sum of the firing rates of the hidden layer neurons 912. The output weights (decoding vectors) may be analytically determined to beneficially provide fast one-shot training. As such, one mechanism for improving/optimizing the neural network may be realized by virtue of the controlling the firing rates of the neurons.

In one exemplary configuration, the neural network 900, which may for example, be a Neural Engineering Framework (NEF) network, may be operated at low or reduced firing rate according to a bounded error. The bounded error may comprise a target maximum error (E). The target maximum error (E) may correspond to an error tolerance threshold for achieving the transformation of analog inputs to spikes in operating the neural network. For example, the target maximum error may be the maximum allowed mean square error.

A rate bandwidth ($r_B$) may be selected based on the firing rate range. For example, the rate bandwidth may be selected such that $$r_B < r_{NEF}^{max} - r_{min} \quad (15)$$

where $r_{max}$ is the maximum frequency of encoding and $r_{min}$ is the minimum frequency of encoding. The values of the $r_{min}$ and $r_{max}$ may be predetermined or user defined.

For a given value of $r_{min}$ (rate minimum), a neuron model may be selected. It is desirable to reduce the firing to be as close to 0 as possible. In some aspects, the neuron model may be selected based on the following condition:

$$\text{synaptic activity } a(I_0) \leq r_{min} \quad (16)$$

$$\left. \frac{da(I)}{dI} \right|_{I' \geq I_0 + I_{th}} \leq r_B \quad (17)$$

where $I_0$ is an input current, a(I) is the synaptic activity (e.g., firing rate), $I_{th}$ is a spiking threshold such that a(I)=0 when $I < I_{th}$. $I_{th}$ is a function of the selected neuron model.

The neurons 912 of the hidden layer 904 may, for example, be configured in accordance with a neuron model such as a Leaky Integrate and Fire (LIF) neuron model, a quadratic integrate and Fire (QIF) model, a Linear Threshold (LT) neuron model, and a Cold neuron Model, or the like.

The LIF neuron model may be expressed as follows:

$$\tau_{RC} \frac{dv}{dt} = -(v - v_r) + I \text{ if } v > v_{th}; v \to v_r \quad (18)$$

where $\tau_{RC}$ is a time constant, v is the membrane potential, $v_r$ is a reset value, and $v_{th}$ is threshold value.

The QIF neuron model may be expressed as follows:

$$\tau_{RC} \frac{dv}{dt} = v^2 - v_b + I \text{ if } v > v_{th}; v \to v_r \quad (19)$$

where $\tau_{RC}$ is a time constant, v is the membrane potential, $v_r$ is a reset value, and $v_{th}$ is threshold value.

The LT neuron model may be expressed as follows:

$$\tau_{RC} \frac{dv}{dt} = I - v_{th} \text{ if } v > v_{th}; v \to v_r \quad (20)$$

where $\tau_{RC}$ is a time constant, v is the membrane potential, $v_r$ is a reset value, and $v_{th}$ is threshold value.

The neuron model may be selected such that the conditions specified in Equation 16 and 17 are satisfied. By selecting a neuron model based on these conditions and populating the hidden layer with neurons 912 configured according to the selected neuron model, the neural network 900 may be operated at a low firing rate.

By way of example, the performance of the neural network using various neuron models may be compared to identify a desired or even optimal model neuron for the hidden layer neurons. In accordance with aspects of the present disclosure, a neuron model and a rate bandwidth may be selected. For example, for the LT model the synaptic activity may be given by:

$$a(I) = \frac{1000(I - v_{th})}{\tau_{RC} v_{th}} \forall I \geq v_{th} \quad (21)$$

Accordingly, Equations 16 and 17 above are satisfied for any $r_B > 0$ and $r_{min} \geq 0$, with an input current $I_0 = v_{th}$; and time constant $\tau_{RC} = 20$ ms.

In another example, the synaptic activity for the LIF model may be given by:

$$a(I) = \frac{-1000}{\tau_{RC} \log(1 - v_{th}/I)} \forall I \geq v_{th} \quad (22)$$

Accordingly, Equations 16 and 17 above are satisfied for $r_B = 60$; $r_{min} = 5$ with non-standard model parameters (e.g., time constant $\tau_{RC} = 400$ ms as compared to the standard time constant $\tau_{RC} = 20$ ms). However, Equations 16 and 17 may not be satisfied for $r_B = 60$; $r_{min} = 5$ with standard model parameters (i.e., $\tau_{RC} = 20$ ms).

In a further example, the synaptic activity for the QIF model may be given by:

$$a(I) = \frac{1000\sqrt{I - v_b}}{\tau_{RC}\tan^{-1}(v_{th}/\sqrt{I - v_b})} \forall\, I \geq v_b \quad (23)$$

As such, Equations 16 and 17 above are satisfied for $r_B > 100$ and $r_{min} \geq 5$ with input current $I_0 = v_{th}$ and time constant $\tau_{RC} = 20$ ms.

In one exemplary aspect, the neural network may be configured to operate with a low firing rate as follows:

Select a range of neuron firing rates for the hidden neurons 912, $r_{min}$ to $r_{max}$. The values for $r_{min}$ and $r_{max}$ may be user defined or may be selected based on the input and output signals of a function, such as their Nyquist rates (e.g. $r_{min}$>input signal Nyquist rate), and target hardware parameters, such as tau step size.

Choose a rate range and rate bandwidth ($r_B$), such that $r_B < r_{max} - r_{min}$. In some aspects, a large $r_B$ may be chosen to meet this constraint and fits other factors, such as parameter quantization for fixed point.

Select a neuron model that satisfies Equations 16 and 17 as specified above. In one exemplary configuration, the neuron model may be the Linear Threshold neuron model. Of course, QIF, LIF and other neuron models may also be selected. In some aspects, computation, power, performance desires and available neuron models may also serve as a basis for neuron model selection, for example, where multiple neurons satisfy Equations 16 and 17.

Further, a set of parameters for the neuron model that satisfy Equations (16) and (17) may be selected. In some aspects, this may occur using a parameter search approach, for example. Additional criteria may further be specified for neural network optimization. Alternatively, the set of parameters for the neuron model may be determined using the solution spaces specified above or the like.

Model weights are determined based on the selected neuron model and set of parameters to realize the function. In some aspects, a NEF procedure may determine model weights.

In some aspects, the model performance may be checked against the targeted performance. Further, the model parameters may be modified to improve performance, while satisfying Equations 16 and 17.

Operating a Neural Network using a Reduced Number of Model Neurons

Once a neural model is detected, the neural network 900 may be improved by reducing a set of model neurons 912 (are corresponding synapses). Operating the neural network 900 with a reduced number of model neurons 912 may have significant performance and cost benefits. For example, a reduced set of model neurons in a neuronal network may improve storage capacity on hardware systems (e.g., more neuron layers may be packed onto a hardware systems) and may decrease computational complexity and power consumption.

In accordance with an exemplary aspect of the present disclosure, a reduced set of model neurons (may be referred to as "effective" neurons) may be obtained by generating a sparse (i.e., having some zero values) set of decoding vectors φ (decoding vectors φ may represent synaptic connection weights). In turn, the neural network 900 may be operated using only neurons with non-zero decoding vectors. That is, hidden layer neurons (e.g., 912b, 912c) coupled to the output layer 906 via a synaptic connection (e.g., 910b, 910c) with a zero weight may be removed such that the neural network 900 may be operated using only the remaining neurons.

The sparse set of decoding vectors φ may be generated using regularization techniques. Regularization techniques may reduce model complexity that may result in overfitting and other problems. Accordingly, regularization techniques may reduce the number of synaptic connections and/or neurons in a neural network. Regularization results in fewer small values, instead increasing the number of zero values.

For example, in some aspects, the sparse set of decoding vectors φ may be generated using least-squares optimization with L1 regularization (also known as LASSO (least absolute shrinkage and selection operator) optimization) as follows:

$$\underset{\phi}{\operatorname{argmin}}(\|y - \hat{y}\|_2^2 + \lambda \|\Phi\|_1) \quad (24)$$

where λ is a regularization term (which is varied to meet performance targets) and $\hat{y}$ is an estimate of the output corresponding to the weighted sum of firing rates, which may be supplied to the output layer 906 and is given by:

$$\hat{y} = \sum_{i=1}^{N} a_i(x)\phi_i \quad (25)$$

where x is the input signal, $a_i(x)$ (i=1, ..., N) is the neural response function and φ is the decoding vector. Applying, L1 regularization, optimal decoding vectors may be determined. In performing the L1 regularization, some of the decoding vectors φ or synaptic connections may be zeroed out.

Method 1:

In one exemplary configuration, a reduced set of model neurons may be determined by generating a neural network with N nodes in the hidden layer. In some aspects, the neural network may be a NEF network or the like.

LASSO processing may generate a sparse-set of M (M≤N) non-zero decoding vectors. The neurons with non-zero decoding vectors may be labeled as effective model neurons. The neural network may thus be operated with only the effective model neurons. Accordingly, the neural network may be operated with a reduced set of neurons and corresponding connections there between.

Method 2:

In a second exemplary configuration, a reduced set of model neurons may be determined by generating M<N effective model neurons as described in Method 1. A new layer may be generated with the new layer comprising the M effective model neurons and a new set of N–M model neurons.

LASSO processing may generate a sparse-set (L≤M≤N) of non-zero decoding vectors. The set of L neurons with non-zero decoding vectors may be labeled as effective model neurons. The neural network may in turn be operated with only the effective model neurons. Accordingly, the neural network may be operated with a reduced set of neurons and corresponding interconnections.

Method 3:

In a further exemplary configuration, a reduced set of model neurons may be determined by repeating Method 1 L times to generate a regularized committee of neural networks with L hidden layers comprising of M≤N effective model neurons each. The committee of neural networks may be pooled to implement a neural network comprising $N^{RC}$ effective model neurons, where $$N^{RC} = \sum_{l=1}^{L} M_l \leq N \tag{26}$$

Method 4:

In still a further exemplary configuration, a reduced set of model neurons may be determined by performing LASSO processing on the set of $N^{RC}$ effective model neurons from Method 3 to generate a sparse set $M^{RC} \leq N^{RC}$ of decoding vectors. The neuron network may be implemented with the new set of $M^{RC}$ effective model neurons.

Although, the exemplary configurations described above utilize LASSO regularization, L2 regularization or other regularization methods could also be used. For example, in one aspect, L2 regularization may be used. In some aspects, generating the sparse set of non-zero decoding vectors may further comprise setting decoding vectors having small values (e.g., absolute value less than a threshold) to zero.

In some aspects, the regularization term (λ) of Equation 24 may be selected to reduce or even minimize the number of effective neurons for a given value of expected desired performance. That is, the regularization term (λ) may be selected for example, based on an error rate, a number of neurons, other system and/or performance consideration or metrics. For example, for Method 1, a performance target (e.g., in terms of MSE (mean square error)) may be set and used to find the reduced number of effective neurons to meet the desired level of performance target by varying λ. The error tolerance can be user selected, and then the regularization term can be set accordingly.

In some aspects, a neural network (e.g., 900) including a reduced set of model neurons (e.g., according to Methods 1-4 above) in hidden layer (e.g., 904) may be operated at a low firing rate as described above, thereby producing a further optimized neural network.

In some aspects of the present disclosure, a neural network may be generated by selecting a neuron model (e.g., a spiking neuron model) having a membrane potential that changes linearly with the input current and resetting the membrane potential when it reaches a threshold.

Figure 10A:
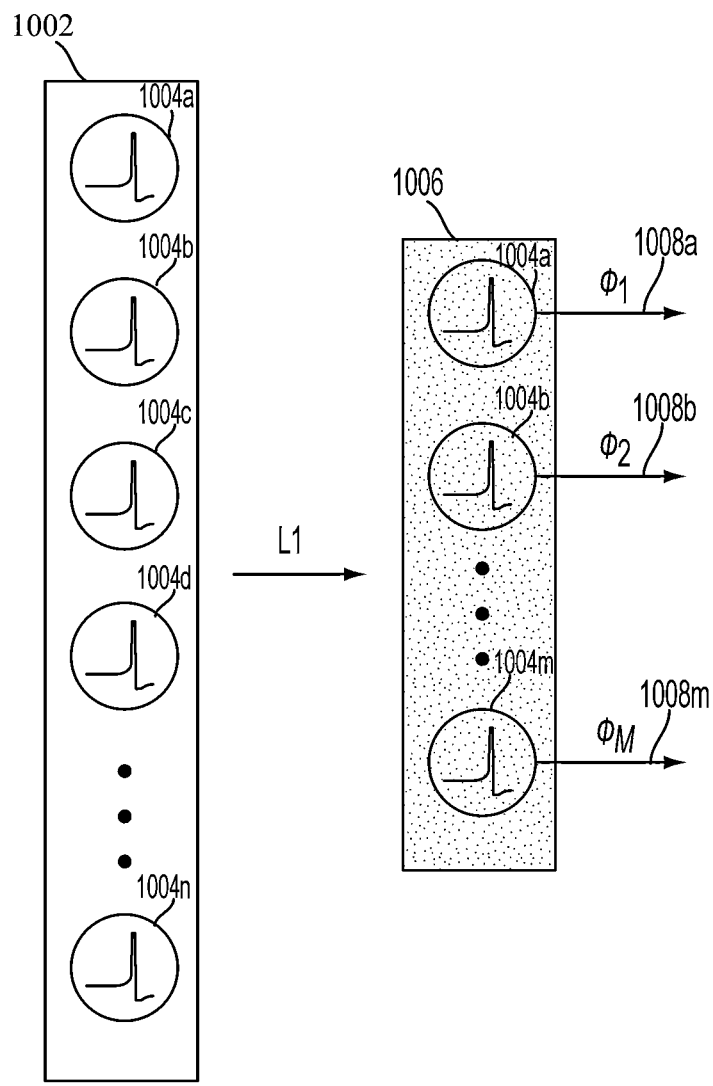
FIGS. 10A-D are exemplary diagrams illustrating reduced sets of model neurons in accordance with aspects of the present disclosure.

FIGS. 10A-D are exemplary diagrams illustrating reduced sets of model neurons. FIG. 10A illustrates a reduced set of model neurons generated according to Method 1 described above. FIG. 10A shows hidden layer 1002 of a neural network including N neurons (e.g., 1004a, . . . , 1004n, which may be referred to as neurons 1004). The hidden layer 1002 may be configured similar to that of the hidden layer 904 of FIG. 9.

LASSO processing (L1) may be performed to estimate or learn the postsynaptic weights represented by the decoding vectors (e.g., 1008). Applying the L1 regularization, some of the estimated or learned decoding vectors weights may be set to zero, while the remainder may be set to a non-zero value. The decoding vectors having a zero weight may be removed thereby generating a reduced set or more sparse set of decoding vectors, which may be referred to as a sparse-set M≤N non-zero decoding vectors 1008a, . . . , 1008m (which may be collectively referred to as non-zero decoding vectors 1008).

In some aspects, the neurons associated with decoding vectors having a zero weight are removed from the hidden layer 1002 to produce a modified hidden layer 1006. The M remaining hidden layer neurons (e.g., 1004a, . . . , 1004m) with non-zero decoding vectors (e.g., 1008a, . . . , 1008m) may be labeled as effective model neurons 1004a, . . . 1004m. In this way, a reduced set of M hidden layer neurons 1004 may be realized. Accordingly, the neural network may be operated with the reduced set of neurons 1006 and corresponding interconnections.

Figure 10B:
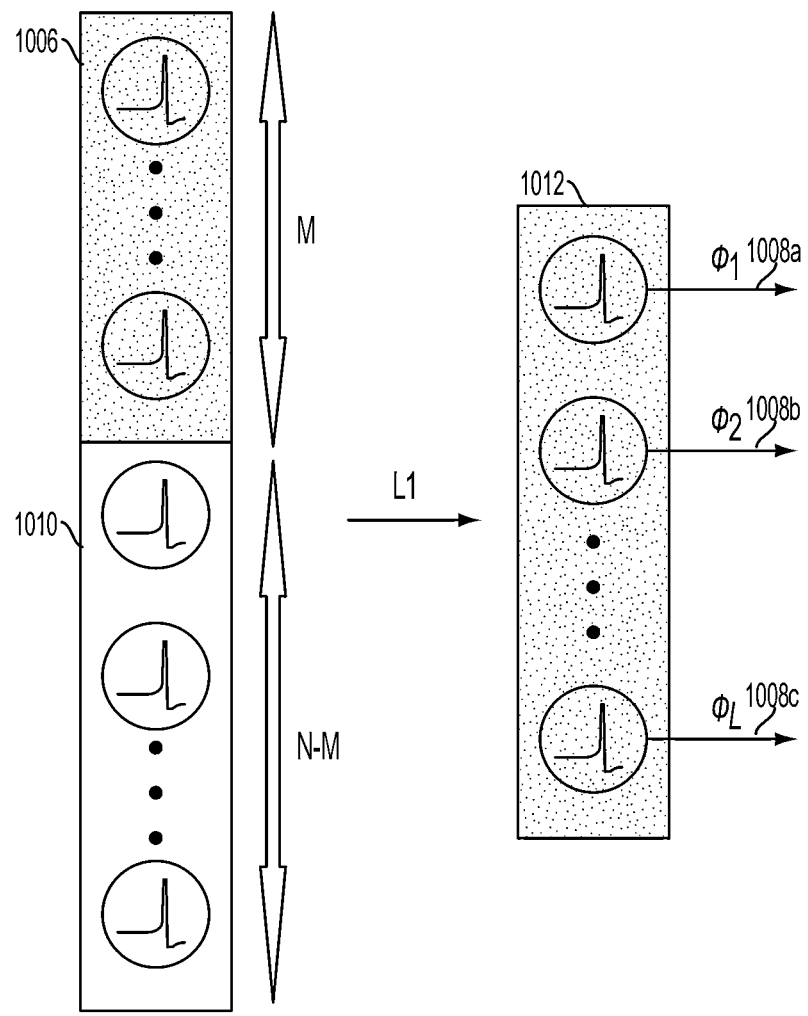

FIG. 10B illustrates a reduced set of model neurons generated according to Method 2 described above. FIG. 10B shows a modified hidden layer 1006 of a neural network including M effective model neurons generated according to Method 1 (and shown in FIG. 10A) and a new set of N–M model neurons 1010. In some aspects, the weights of the presynaptic connections for the M effective model neurons (1006) may be fixed, while the weights of the presynaptic connections for new set of N–M model neurons may be random.

LASSO processing (L1) may be performed on the combination of the M effective model neurons (1006) and the new set of N–M model neurons (1010) to learn decoding vector weights (e.g., 1008a). As discussed above with respect to FIG. 10A, some of the decoding vector weights may be zero and thus removed to thereby generate a sparse-set of L (L≤M≤N) non-zero decoding vectors 1008.

Similarly, the hidden layer neurons having zero weight decoding vectors may also be removed to produce a hidden layer 1012 including L neurons. The set of L neurons with non-zero decoding vectors may be labeled as effective model neurons. The neural network may, in turn, be operated with only the L effective model neurons in the hidden layer 1012. Accordingly, the neural network may be operated with a reduced set of neurons and corresponding connections there between.

Figure 10C:
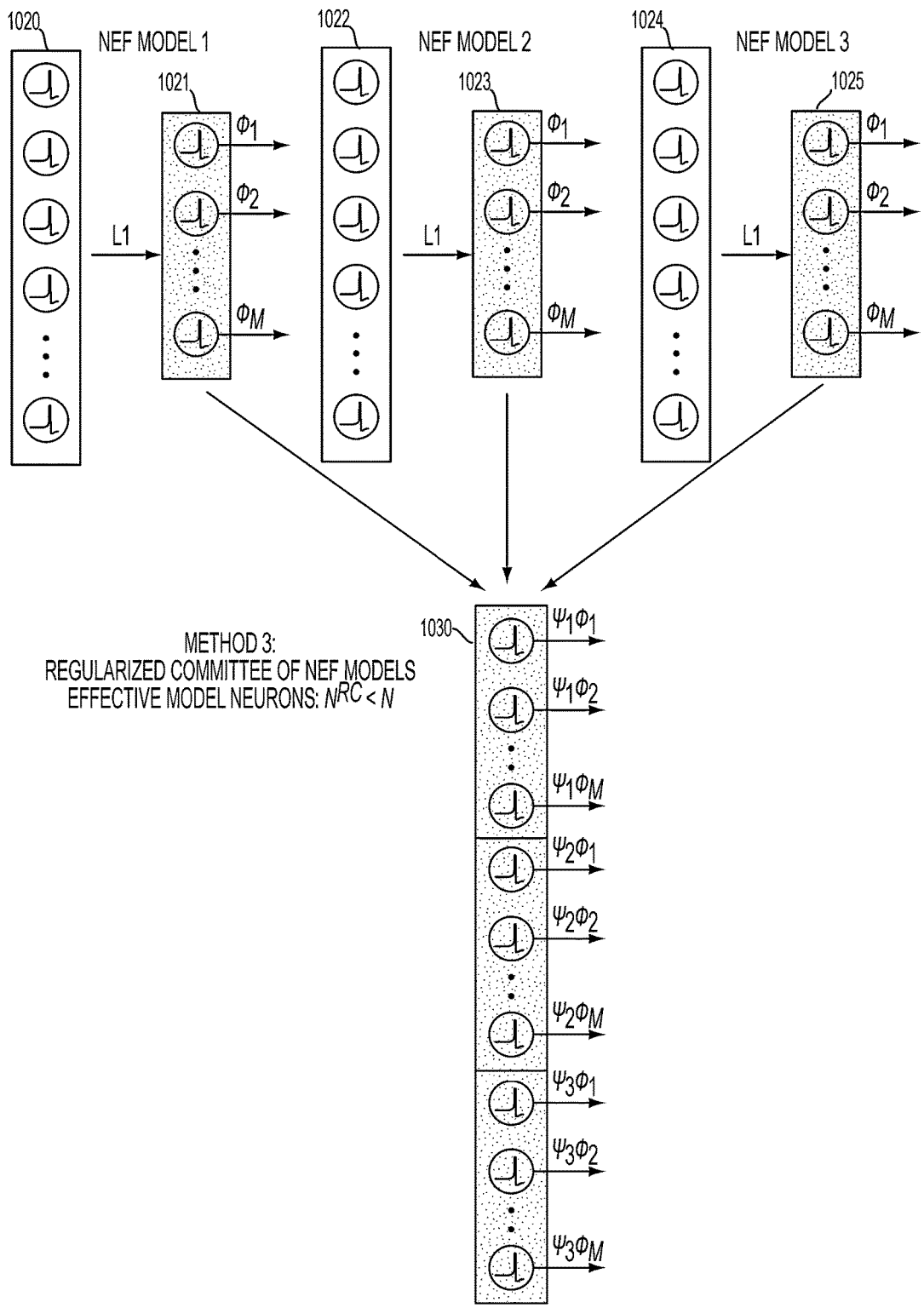

FIG. 10C illustrates a reduced set of model neurons generated according to Method 3 described above. As shown in FIG. 10C, a regularized committee of neural networks includes hidden layers comprising M (M≤N) effective model neurons (1021, 1023, 1025) each generated according to Method 1 described above (and shown in FIG. 10A). The regularized committee of neural networks may be pooled to implement a neural network comprising $N^{RC}$ effective model neurons 1030.

Figure 10D:
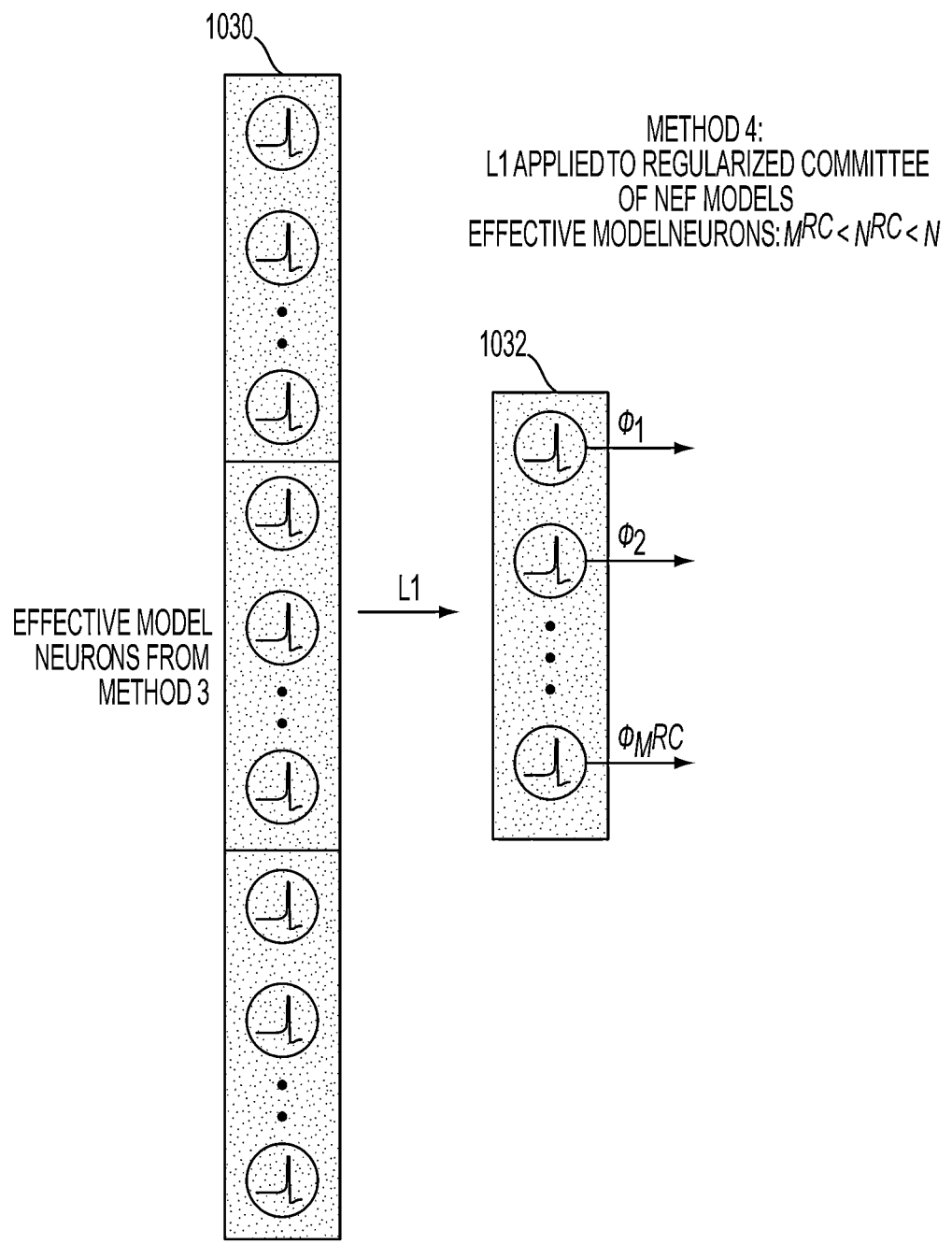

FIG. 10D illustrates a reduced set of model neurons generated according to Method 4 described above. As shown in FIG. 10D, the set of $N^{RC}$ effective model neurons 1030 generated according to Method 3 (and shown in FIG. 10C) may be further reduced by performing LASSO processing (L1) on the set of $N^{RC}$ effective model neurons 1030 to produce a sparse set $M^{RC} \leq N^{RC}$ of decoding vectors (1034). Accordingly, the neural network may be implemented with the new set of $M^{RC}$ effective model neurons 1032.

Figure 11:
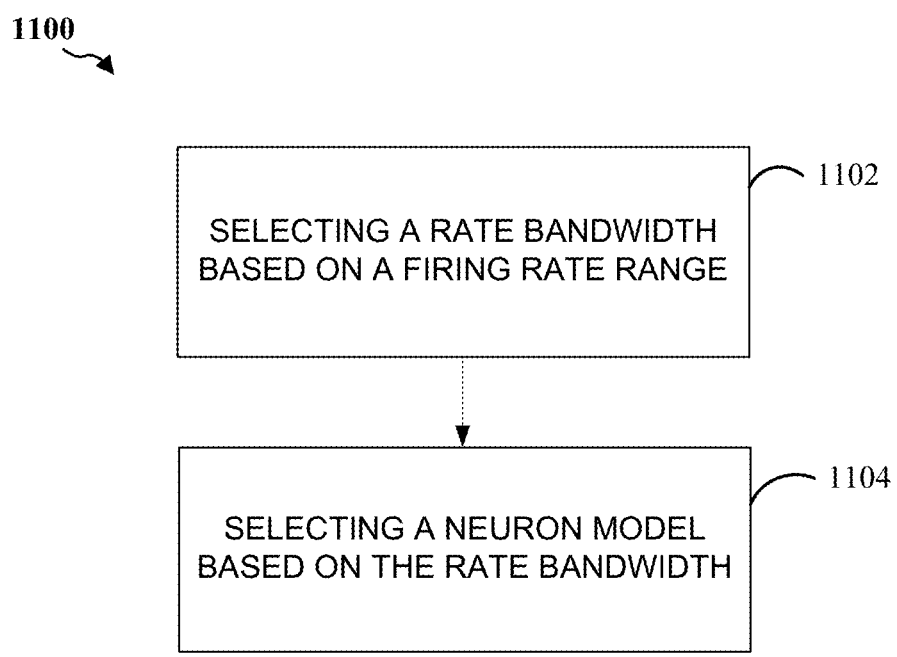
FIG. 11 illustrates a method for selecting a neuron model with a low firing rate for operating in a neural network in accordance with an aspect of the present disclosure.

FIG. 11 illustrates a method 1100 for selecting a neuron model with a low firing rate for operating in a neural network. In block 1102, the process selects a rate bandwidth based on a firing rate range. Furthermore, in block 1104, the process selects a neuron model based on the selected rate bandwidth.

Figure 12:
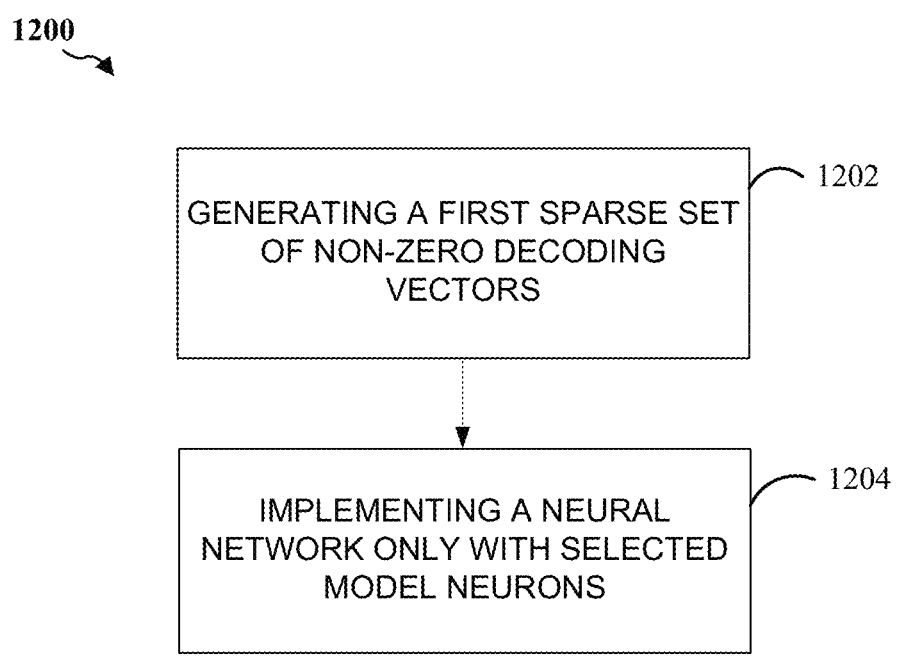
FIG. 12 is a block diagram illustrating a method for selecting a reduced number of model neurons in a neural network in accordance with an aspect of the present disclosure.

FIG. 12 illustrates a method 1200 for selecting a reduced number of model neurons in a neural network. In block 1202, the process generates a first sparse set of non-zero decoding vectors. Each decoding vector is associated with a synapse between a first neuron layer and a second neuron layer. Furthermore, in block 1204, the process implements the neural network only with selected model neurons in the first neuron layer associated with the non-zero decoding vectors.

Figure 13:
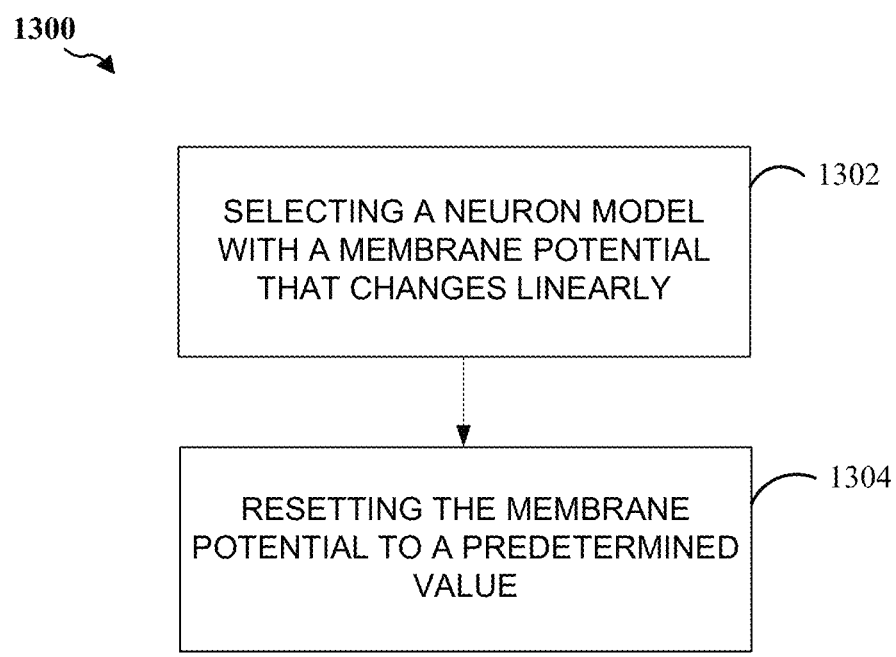
FIG. 13 is a block diagram illustrating a method for generating a neural network in accordance with an aspect of the present disclosure.

FIG. 13 illustrates a method 1300 for generating a neural network. In block 1302, the process selects a neuron model (e.g., a spiking neuron model). The neuron model has a membrane potential that changes linearly based on an input current. Furthermore, in block 1304, the process resets the membrane potential to a predetermined value when the membrane potential reaches a threshold.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A computer-implemented method for selecting model neurons in an artificial neural network, comprising:
   generating a first sparse set of decoding weights, each decoding weight corresponding to a synapse between a first neuron layer and a second neuron layer;
   selecting, from the first neuron layer, a first set of model neurons corresponding to a first set of non-zero decoding weights selected from the first sparse set of decoding weights;
   updating the first neuron layer to consist of the first set of model neurons; and
   operating the artificial neural network with the updated first neuron layer.

2. The computer-implemented method of claim 1, further comprising performing a least squares optimization to generate the first sparse set of decoding weights.

3. The computer-implemented method of claim 2, in which the least squares optimization comprises least absolute shrinkage and selection operator (LASSO) regularization.

4. The computer-implemented method of claim 2, further comprising selecting a regularization term to reduce a number of non-zero weights in the first sparse set of decoding weights.

5. The computer-implemented method of claim 1, further comprising:
   generating a second sparse set of decoding weights, each decoding weight from the second sparse set corresponding to a synapse between the updated first neuron layer and the second neuron layer; and
   operating the artificial neural network with a second set of model neurons in the updated first neuron layer corresponding to a second set of non-zero decoding weights selected from the second sparse set of decoding weights.

6. The computer-implemented method of claim 1, further comprising:
repeating the generating and the selecting a plurality of times to create a pooled set of model neurons corresponding to non-zero decoding weights; and
operating the artificial neural network with a third set of model neurons selected from the pooled set of model neurons.

7. An apparatus for selecting model neurons in an artificial neural network, comprising:
a memory; and
at least one processor coupled to the memory, the at least one processor being configured:
to generate a first sparse set of decoding weights, each decoding weight corresponding to a synapse between a first neuron layer and a second neuron layer;
to select, from the first neuron layer, a first set of model neurons corresponding to a first set of non-zero decoding weights selected from the first sparse set of decoding weights;
to update the first neuron layer to consist of the first set of model neurons; and
to operate the artificial neural network with the updated first neuron layer.

8. The apparatus of claim 7, in which the at least one processor is further configured to perform a least squares optimization to generate the first sparse set of decoding weights.

9. The apparatus of claim 8, in which the least squares optimization comprises least absolute shrinkage and selection operator (LASSO) regularization.

10. The apparatus of claim 8, in which the at least one processor is further configured to select a regularization term to reduce a number of non-zero weights in the first sparse set of decoding weights.

11. The apparatus of claim 7, in which the at least one processor is further configured:
to generate a second sparse set of decoding weights, each decoding weight from the second sparse set corresponding to a synapse between the updated first neuron layer and the second neuron layer; and
to operate the artificial neural network with a second set of model neurons in the updated first neuron layer corresponding to a second set of non-zero decoding weights selected from the second sparse set of decoding weights.

12. The apparatus of claim 7, in which the at least one processor is further configured:
to repeat the generating and the selecting a plurality of times to create a pooled set of model neurons corresponding to non-zero decoding weights; and
to operate the artificial neural network with a third set of model neurons selected from the pooled set of model neurons.

13. An apparatus for selecting model neurons in an artificial neural network, comprising:
means for generating a first sparse set of decoding weights, each decoding weight corresponding to a synapse between a first neuron layer and a second neuron layer;
means for selecting, from the first neuron layer, a first set of model neurons corresponding to a first set of non-zero decoding weights selected from the first sparse set of decoding weights;
means for updating the first neuron layer to consist of the first set of model neurons; and
means for operating the artificial neural network with the updated first neuron layer.

14. The apparatus of claim 13, further comprising means for performing a least squares optimization to generate the first sparse set of decoding weights.

15. The apparatus of claim 14, in which the least squares optimization comprises least absolute shrinkage and selection operator (LASSO) regularization.

16. The apparatus of claim 14, further comprising means for selecting a regularization term to reduce a number of non-zero weights in the first sparse set of decoding weights.

17. The apparatus of claim 13, further comprising:
means for generating a second sparse set of decoding weights, each decoding weight from the second sparse set corresponding to a synapse between the updated first neuron layer and the second neuron layer; and
means for operating the artificial neural network with a second set of model neurons in the updated first neuron layer corresponding to a second set of non-zero decoding weights selected from the second sparse set of decoding weights.

18. The apparatus of claim 13, further comprising:
means for repeating the generating and the selecting a plurality of times to create a pooled set of model neurons corresponding to non-zero decoding weights; and
means for operating the artificial neural network with a third set of model neurons selected from the pooled set of model neurons.

19. A non-transitory computer readable medium having encoded thereon program code for selecting model neurons in an artificial neural network, the program code executed by a processor and comprising:
program code to generate a first sparse set of decoding weights, each decoding weight corresponding to a synapse between a first neuron layer and a second neuron layer;
program code to select, from the first neuron layer, a first set of model neurons corresponding to a first set of non-zero decoding weights selected from the first sparse set of decoding weights;
program code to update the first neuron layer to consist of the first set of model neurons; and
program code to operate the artificial neural network with the updated first neuron layer.

20. The non-transitory computer readable medium of claim 19, further comprising program code to perform a least squares optimization to generate the first sparse set of decoding weights.

21. The non-transitory computer readable medium of claim 20, in which the least squares optimization comprises least absolute shrinkage and selection operator (LASSO) regularization.

22. The non-transitory computer readable medium of claim 20, further comprising program code to select a regularization term to reduce a number of non-zero weights in the first sparse set of decoding weights.

23. The non-transitory computer readable medium of claim 19, further comprising:
program code to generate a second sparse set of decoding weights, each decoding weight from the second sparse set corresponding to a synapse between the updated first neuron layer and the second neuron layer; and program code to operate the artificial neural network with a second set of model neurons in the updated first neuron layer corresponding to a second set of non-zero decoding weights selected from the second sparse set of decoding weights.

24. The non-transitory computer readable medium of claim 19, further comprising:

program code to repeat the generating and the selecting a plurality of times to create a pooled set of model neurons corresponding to non-zero decoding weights; and program code to operate the artificial neural network with a third set of model neurons selected from the pooled set of model neurons.

\* \* \* \* \*